United States Patent
Le Calvez et al.

(10) Patent No.: US 8,639,443 B2
(45) Date of Patent: Jan. 28, 2014

(54) MICROSEISMIC EVENT MONITORING TECHNICAL FIELD

(75) Inventors: Joel Herve Le Calvez, Farmers Branch, TX (US); Stewart Thomas Taylor, Farmers Branch, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 341 days.

(21) Appl. No.: 12/420,929

(22) Filed: Apr. 9, 2009

(65) Prior Publication Data

US 2010/0262372 A1  Oct. 14, 2010

(51) Int. Cl.
*G01V 1/28* (2006.01)

(52) U.S. Cl.
USPC ...... 702/16; 702/6; 702/14; 702/17; 702/190; 367/28; 367/32; 367/43; 367/47; 367/49; 367/70; 708/300; 708/304

(58) Field of Classification Search
USPC ............. 702/6, 12, 14, 16, 76, 17, 67, 190; 367/28, 32, 43, 47, 49, 70; 708/300, 708/304
See application file for complete search history.

(56) References Cited

U.S. PATENT DOCUMENTS

| | | | |
|---|---|---|---|
| 4,885,722 A * | 12/1989 | Leland | 367/25 |
| 5,373,486 A * | 12/1994 | Dowla et al. | 367/135 |
| 5,774,415 A | 6/1998 | Hall et al. | |
| 5,920,828 A * | 7/1999 | Norris et al. | 702/14 |
| 5,996,726 A | 12/1999 | Sorrells et al. | |
| 6,049,508 A | 4/2000 | Deflandre | |
| 6,462,549 B1 | 10/2002 | Curtis et al. | |
| 6,748,330 B2 | 6/2004 | Leaney | |
| 6,920,083 B2 | 7/2005 | Therond et al. | |
| 7,391,675 B2 | 6/2008 | Drew | |
| 7,457,195 B2 | 11/2008 | Jones | |
| 2002/0169735 A1 * | 11/2002 | Kil et al. | 706/46 |
| 2004/0044479 A1 * | 3/2004 | Sansone | 702/16 |
| 2004/0059763 A1 * | 3/2004 | Selvaraj | 708/300 |
| 2006/0023567 A1 | 2/2006 | Uhl et al. | |
| 2006/0114746 A1 * | 6/2006 | Gardner et al. | 367/82 |
| 2007/0299614 A1 * | 12/2007 | Dewarrat | 702/16 |
| 2008/0259727 A1 | 10/2008 | Drew | |
| 2009/0010104 A1 | 1/2009 | Leaney | |
| 2009/0299637 A1 * | 12/2009 | Dasgupta | 702/12 |

FOREIGN PATENT DOCUMENTS

WO  2004/070424 A1  8/2004

* cited by examiner

*Primary Examiner* — Alexander H Taningco
*Assistant Examiner* — Paul D Lee (57) ABSTRACT

A microseismic monitoring system includes a seismic sensor positioned proximate to a wellbore traversing a formation; an orientation source producing an orientation shot; a hydraulic apparatus operationally connected with the formation to produce a fracture in the formation; a computer control system operationally connected with a database of known spectral attributes for event categories; and a computer readable medium that carries instructions executable by the computer control system that, when executed: receive data from the seismic sensor; select an event of interest from the data received; determine a spectral estimate of the selected event of interest; compare the determined spectral estimate of the selected event of interest to the known spectral estimates; and select from the data received by the seismic source the orientation shot for orientation of the seismic sensor.

17 Claims, 7 Drawing Sheets

Single-Sided Amplitude Spectrum of y(t)

MICROSEISMIC EVENT MONITORING TECHNICAL FIELD

TECHNICAL FIELD

The present invention relates in general to methods and systems for investigating subterranean formations and, more particularly, to methods and systems for discriminating seismic events.

BACKGROUND

In order to improve the recovery of hydrocarbons from oil and gas wells, the subterranean formations surrounding such wells can be hydraulically fractured. Hydraulic fracturing is used to create small cracks in subsurface formations to allow oil or gas to move toward the well. Formations are fractured by introducing specially engineered fluids at high pressure and high flow rates into the formations through the wellbores.

The fracture fluids are preferably loaded with proppants, which are usually particles of hard material such as sand. The proppant collects inside the fracture to permanently "prop" open the new cracks or pores in the formation. The proppant creates a plane of high-permeability sand through which production fluids can flow to the wellbore. The fracturing fluids are preferably of high viscosity, and therefore capable of carrying effective volumes of proppant material.

Recently, there has been an effort to monitor hydraulic fracturing and produce maps that illustrate where the fractures occur and the extent of the fractures. Current hydraulic fracture monitoring comprises methods of processing seismic event locations by mapping seismic arrival times and polarization information into three-dimensional space through the use of modeled travel times and/or ray paths. Travel time look-up tables may be generated by modeling for a given velocity model. Non-linear event locations methods are commonly used to locate the seismic event location.

Non-linear event location methods involve the selection and time picking of discreet seismic arrivals for each of multiple seismic detectors and mapping to locate the source of seismic energy. However, to successfully and accurately locate the seismic event, the discrete time picks for each seismic detector need to correspond to the same arrival of either a "P" or "S" wave and be measuring an arrival originating from the same event. During a fracture operation, many hundreds of microseismic events may be generated in a short period of time. Thus, one difficulty is to correctly identify the source of each microseismic event and to correctly identify an arrival time with a correct wave-type (e.g., P-wave, S-wave). If a picked arrival time is badly incorrect or the picked arrival time is for the wrong wave type, the estimated location of the origin of the seismic event is likely to differ significantly from the true location.

Current techniques commonly employed in the industry require considerable human intervention to quality control the time picking results. It can often take weeks from the time of recording and detecting the microseismic events to produce accurate maps of the event locations. Even so, the result, which requires human interaction and interpretation, can lead to multiple and non-reproducible solutions.

SUMMARY

An embodiment of a system of discriminating a controlled seismic source from a subsurface seismic source may include a seismic sensor positioned proximate to a wellbore; a controlled seismic source to produce a seismic wave; a computer in communication with the seismic sensor; and a set of instructions executable by the computer that, when executed: acquire data received from the seismic sensor; select an event of interest from the acquired data; determine a spectral attribute of the selected event of interest; compare the determined spectral attribute of the selected event of interest to a known event category spectral attribute; and identify the selected seismic event of interest relative to the known spectral event category attribute.

An embodiment of a computer readable medium carries instructions to identify a source of a seismic event by performing steps including receiving data from a seismic sensor; selecting an event of interest from the data received; determining a spectral estimate of the selected event of interest; and identifying if the selected event of interest is a desired event of interest.

An embodiment of a microseismic monitoring system includes a seismic sensor positioned proximate to a wellbore traversing a formation; an orientation source producing an orientation shot; a hydraulic apparatus operationally connected with the formation to produce a fracture in the formation; a computer control system operationally connected with a database of known spectral attributes for event categories; and a computer readable medium that carries instructions executable by the computer control system that, when executed: receive data from the seismic sensor; select an event of interest from the data received; determine a spectral estimate of the selected event of interest; compare the determined spectral estimate of the selected event of interest to the known spectral estimates; and select from the data received by the seismic source the orientation shot for orientation of the seismic sensor.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Refer now to the drawings wherein depicted elements are not necessarily shown to scale and wherein like or similar elements are designated by the same reference numeral through the several views.

Microseismic monitoring includes velocity modeling, survey design, seismic sensor (e.g., receiver, sensor, geophone, accelerometer, antennae, etc.) orientation, model calibration, and an acquisition phase, processing phase and interpretation. Examples of methods and systems for microseismic monitoring are disclosed in U.S. Pat. Nos. 7,457,195; 7,391,675; 6,748,330; 6,462,549; and U.S. Published Patent Applications 2008/0259727 and 2009/0010104, all of which are incorporated herein by reference.

An essential step in the data processing requires knowledge of the seismic sensor orientation (e.g., the directional alignment of each axis of the tri-axial sensor) for calibration. A controlled seismic source (e.g., a surface seismic source, perforation shot, string shot) may be utilized to determine the orientation of the seismic sensor(s) prior to monitoring of the microseismic events. The incident P-wave analysis using hodogram analysis may be utilized to determine the seismic sensor orientation with a known location of the seismic sensor and the controlled seismic source. Accurate orientation of the seismic sensor is also important for anisotropy determination. For example, utilizing the nearest perforation shot to process the treated reservoir zone improves the identification of the microseismic event (e.g., hydraulic fracture) location. In many situations the precise time of the controlled seismic shot may not be known thus limiting the ability to correctly identify it as an orientation shot. For example, the orientation shot in the hydraulic operation may be preceded by another microseismic event resulting in misidentifying the orientation shot. Systems, methods, and apparatus disclosed herein facilitate discriminating between a subsurface source point (e.g., a hydraulic fracture, perforation of the casing and/or formation, etc.) and a controlled seismic source point or orientation shot (e.g., surface source, perforation shot, string shot, plug shot, etc.). Although the controlled seismic source may be positioned subsurface, for example in wellbore 12 or 14, it is not considered a "subsurface seismic source" for purposes herein.

Figure 1:
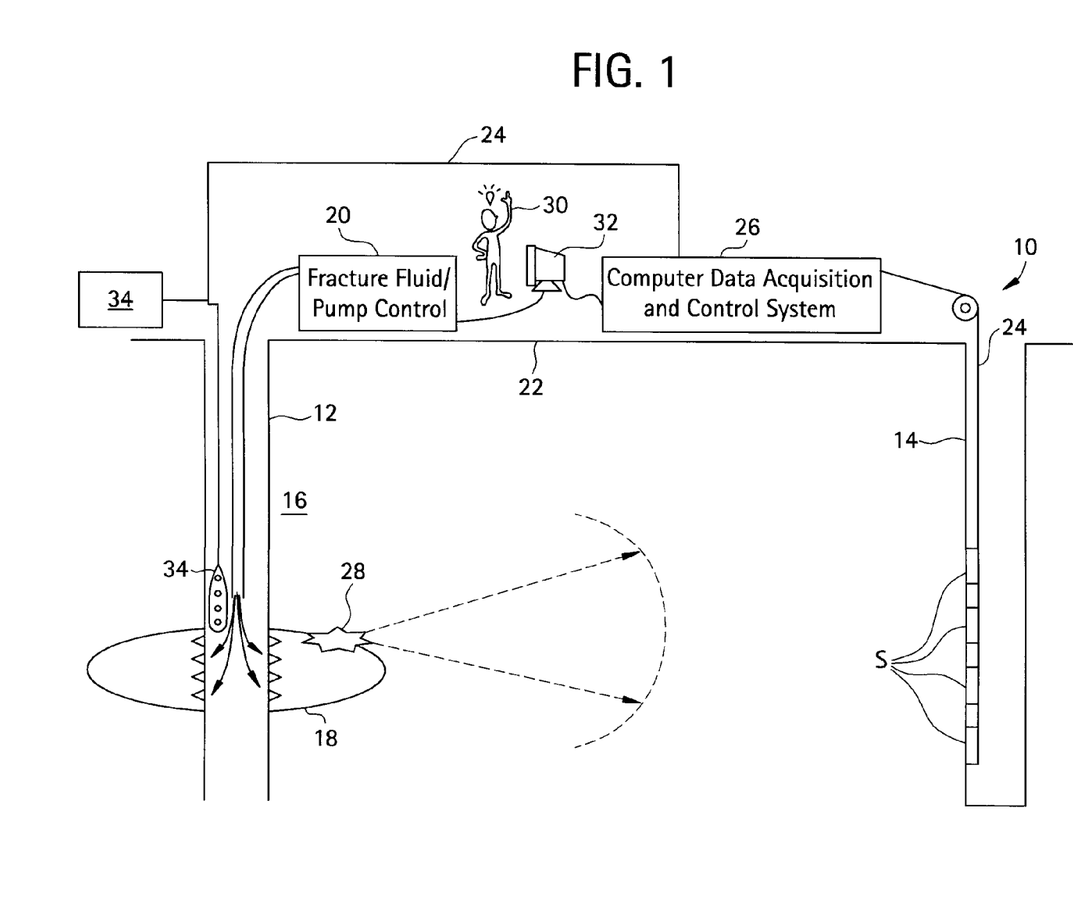
FIG. 1 is an illustration of a seismic monitoring system and a hydraulic fracturing system according to an embodiment of the present invention.

Refer now to FIG. 1 wherein an illustration of a seismic monitoring system and hydraulic fracture system in accordance with an exemplary embodiment of the present invention is provided. The methods and systems described above may be implemented in real time, for example, by a hydraulic fracture and monitoring system 10. In this embodiment, system 10 includes a first and a second wellbore 12, 14. First wellbore 12 traverses a formation 16 with a zone 18 that is scheduled for hydraulic fracture. A hydraulic fracture apparatus 20 comprising a fracture fluid, a pump, and controls is coupled to first wellbore 12. Second wellbore 14 contains one or more temporary and/or permanent seismic sensors S. Sensors S may be placed along a surface 22 and/or within first wellbore 12 as well. Sensors S may include various devices, including without limitation, geophones and accelerometers for receiving waveform data from sources including, for example, hydraulic fracturing, a perforating gun, string shots and the like. A communication link 24, such a telemetry wire, facilitates communication between sensors S and a computer data acquisition and control system 26. Control system 26 may include one or more processing units and may be located proximate to wellbore 12, wellbore 14 and/or remote from the wellbores.

As a fracture job commences, fracture fluid is pumped into first wellbore 12, creating microseismic events 28 as zone 18 is fractured and as the fracture propagates. Microseismic events 28 create seismic waves that are received by detectors of sensors S. One or more controlled seismic energy sources 34 may be utilized in particular to calibrate the models and/or to orient sensors S. For purposes of illustration, FIG. 1 illustrates a controlled seismic source 34 on the surface and in first wellbore 12. Surface seismic sources are well known in the art and include, without limitation, vibrators, stompers, explosives, and air guns. Common subsurface seismic sources include perforation shots or string shots. In FIG. 1, controlled seismic sources 34 are illustrated connected to computer data acquisition and control system 26 via a communication link 24. Controlled seismic sources 34 may be actuated (e.g., detonated) to propagate a seismic wave for an orientation shot.

The seismic signals received by sensors S may be used to monitor and map microseismic events 28 caused by the fracture operation. Accordingly, based on the seismic signals received, computers, such as the computer data acquisition and control system 26, may run programs containing instructions, that, when executed, perform methods according to the principles described herein. Furthermore, the methods described herein may be fully automated and able to operate continuously in time for monitoring, detecting, and locating microseismic events. An operator 30 may receive results of the methods described above in real time as they are displayed on a monitor 32. Operator 30 may, in turn, adjust hydraulic fracture parameters such as pumping pressure, stimulation fluid, and proppant concentrations to optimize wellbore stimulation based on the displayed information relating to detected and located seismic events.

Figure 2:
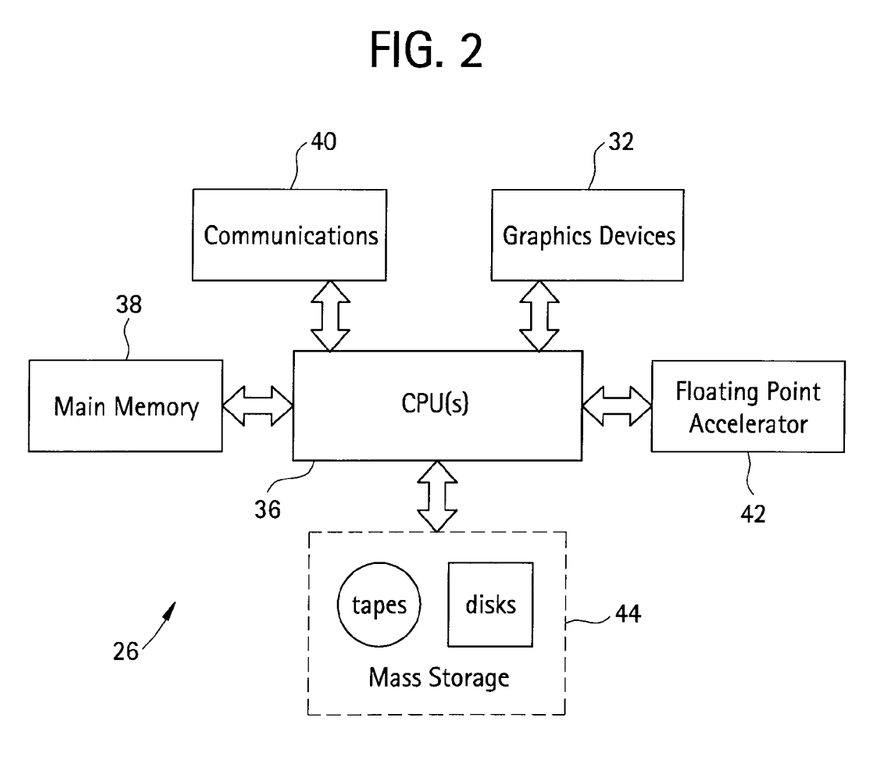
FIG. 2 is a schematic illustration of an embodiment of a computer data acquisition and control system in accordance with an embodiment of the present invention.

Refer now to FIG. 2 wherein an example of computer data acquisition and control system 26 is illustrated. In the illustrated example, computer data acquisition and control system 26, referred to also as control system 26, is implemented on a digital computer preferably configured to process large amounts of data. FIG. 2 illustrates one possible configuration for control system 26. The data processor typically consists of one or more central processing units 36, main memory 38, communications or I/O modules 40, graphics devices 32, a floating point accelerator 42, and mass storage devices such as tapes and discs 44.

Storage device 44 may include a floppy drive, hard drive, CD-ROM, optical drive, or any other form of storage device. In addition, the storage devices may be capable of receiving a floppy disk, CD-ROM, DVD-ROM, disk, flash drive or any other form of computer-readable medium that may contain computer-executable instructions. Further communication device 40 may be a modem, network card, or any other device to enable communication to receive and/or transmit data. It is understood that any control system 26 may include a plurality of interconnected (whether by intranet or Internet) computer systems, including without limitation, personal computers, mainframes, PDAs, cell phones and the like.

Control system 26 and processor 36 may include hardware capable of executing machine readable instructions, as well as the software for executing acts (typically machine-readable instructions) that produce a desired result. In addition, control system 26 may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

An example of a method for discriminating a seismic event of interest from other seismic events is now described with reference to FIGS. 1-7. For example, it may be desired to discriminate the orientation shot from a microseismic event for purposes of calibration. In a first step 302, a library of seismograms is created for common events of interest. The library may be an electronic database and stored in memory of control system 26 for example. The library may include event categories for common events that are to be discriminated, such as, and without limitation, various types of orientations shots, microseismic events, noise producing sources, perforation shots, string shots, plug shots and the like. In step 304 each of the event categories is populated with selected graphs of attributes of the waveforms of the respective event category. The graphs may be prepared from data related to historical seismograms obtained within a field proximate to or that includes for example wellbores 12 and 14 of FIG. 1. In this embodiment, the graphs and displays prepared include amplitude versus frequency; phase versus frequency; frequency versus time; amplitude versus time; and microseismic traces.

Figure 3:
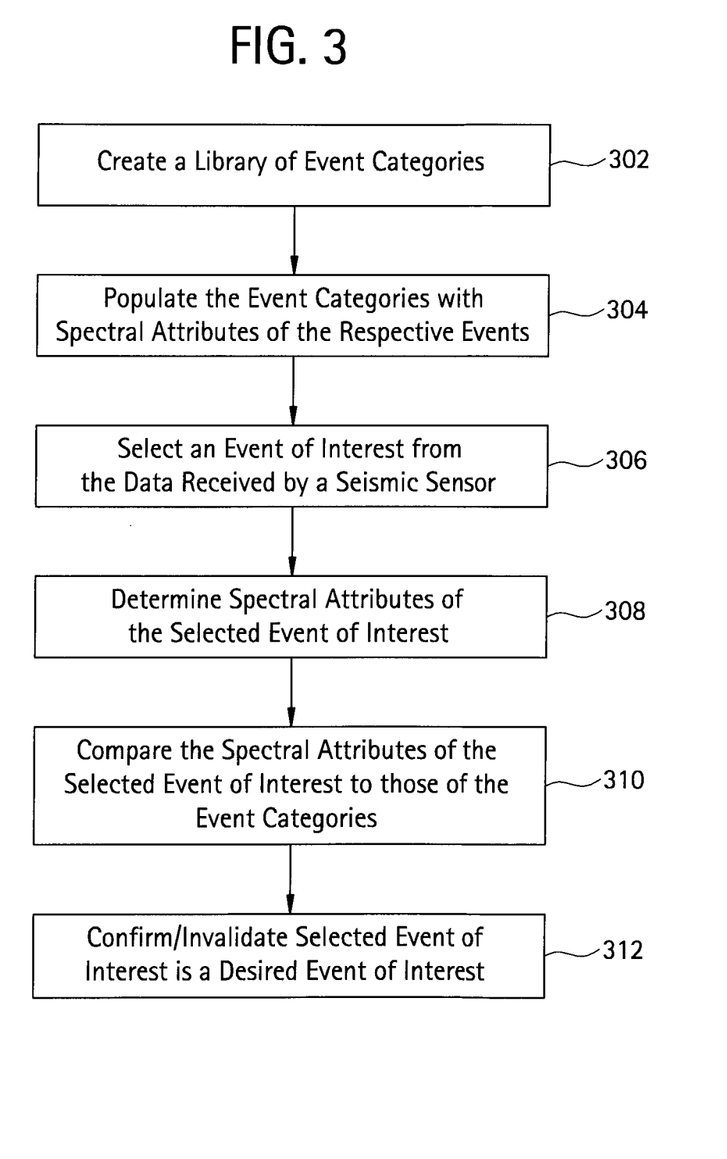
FIG. 3 is a flowchart illustrating a seismic source discrimination process.

An orientation shot may be provided by controlled seismic source 34. The orientation shot may be provided in part to provide a perforation in wellbore 12 and/or to initiate hydraulic fracturing operations. In step 306, data received from a sensor S is selected to be considered an event of interest. In this embodiment, the event of interest is selected to be a portion of the received data associated with the orientation shot. It is desired in this embodiment to correctly identify the orientation shot, and its origination, for purposes of calibration and for monitoring of the hydraulic fracture operations. In step 308, graphs of attributes of the selected event of interest are constructed. In step 310, the graphs of attributes of the selected event of interest are compared to the graphs of attributes of the event categories. In step 312, the identity of the selected event of interest is confirmed as the desired event of interest, the orientation shot in this embodiment. For example, if the desired event of interest was a controlled perforation shot, the selected event of interest (step 306) is compared to the event categories (310). If the spectral attributes of the selected event of interest correlates with the perforation shot event category, in this example, then the selected event of interest is confirmed to be the desired event of interest. If the selected event of interest is invalidated as the desired event of interest then a new event of interest is selected and the process repeated until the selected event of interest is confirmed to be the desired event of interest. Note that although the embodiments are described in terms of identifying the orientation shot, the methods and systems may be utilized to discriminate between other seismic events.

In regard to step 302, seismic waveform data from the records related to the field in which wellbore 12 is located are extracted. The approximate time of the seismic event related to the extracted seismic waveform is determined and may be utilized for extraction of the waveform. The extracted data results in event files. The events files may then be filtered to remove noise. The event files may then be further filtered and analyzed using Fourier transform methods. One analytical tool is a time-frequency display of the seismic waveform. Using time-frequency display analysis, a sub-segment of the data (time window) is utilized to divide the events file into a series of overlapping sub-segments. Each time window may then be processed to create a short-time Fourier Transform (STFT) of the time window data to obtain the spectral estimate of the time window.

Many time windows and STFTs may be created over the interval of time which contains the seismic event. Each of the time windows has a determined spectral estimate. The spectral estimates from the series of STFTs may then be compiled into a series of frequency versus amplitude and frequency versus phase datasets for example. Thus, the series of STFTs result in a time-varying spectral estimate of both frequency versus amplitude and frequency versus phase data. This data is referred to as the time-varying spectral estimate herein. The spectral estimate may change only slightly from time window to time window as the STFT moves with respect to the event progress.

The filtered estimates of the seismic frequency over many time windows emphasize the continuity of the seismic frequency spectrum for the seismic event within a time series. Thus, when two or more seismic events of differing and possibly overlapping spectral content occur, the present process facilitates color coded discrimination of overlapping events via the final filters which may be applied based on estimates of noise using the time-frequency display of the data.

The compilation of time-varying spectral estimates (spectral series) may be manipulated though various digital signal processing algorithms. In this method, the median filtering operation is used as a means to enhance the interpretability of the data. The median filter may be a non-linear digital filtering technique that is often used to remove noise spikes (extremely high or low values) from images or other signals. The median filter is a more robust method than linear filtering because it preserves the sharp edges.

Figure 4:
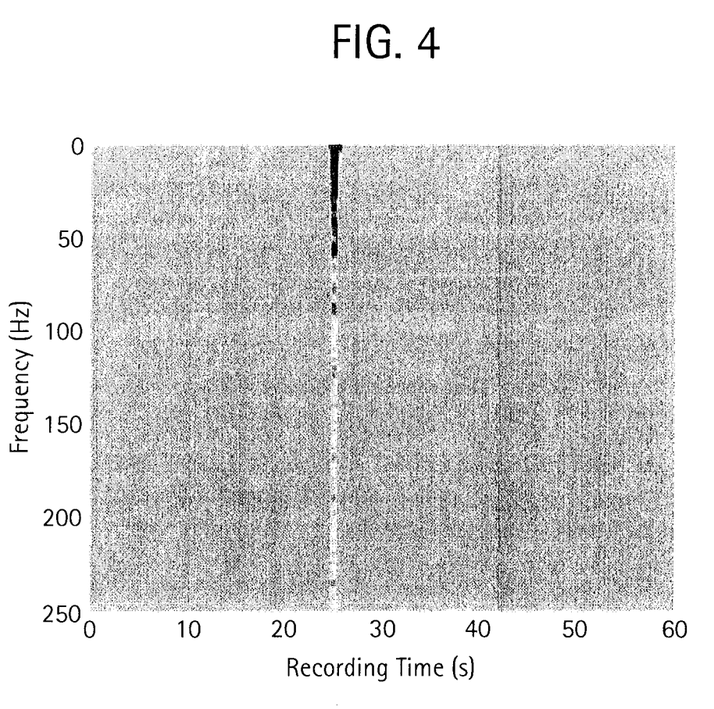
FIG. 4 is a time-frequency display of a microseismic event.
Figure 5:
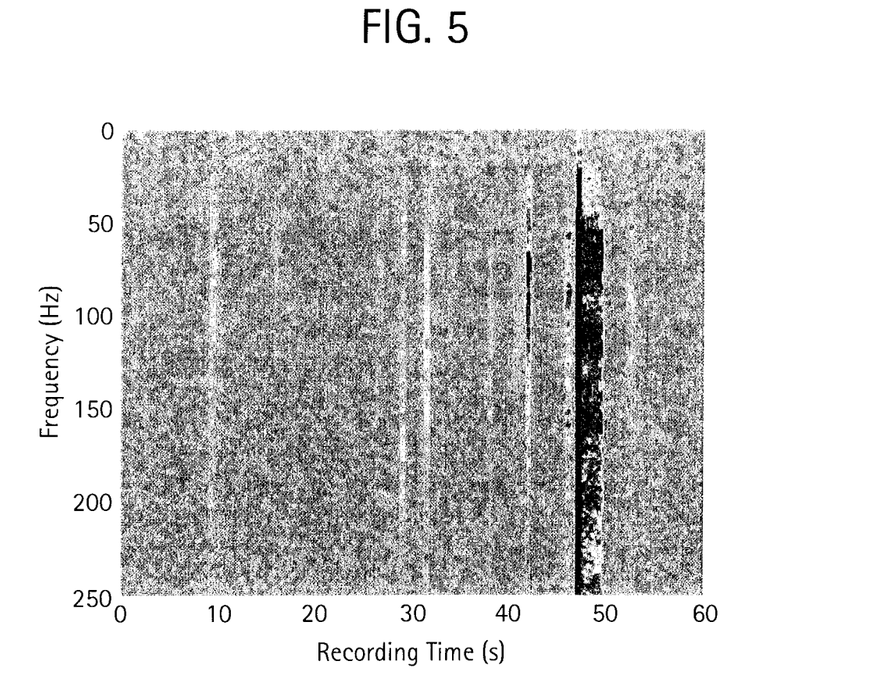
FIG. 5 is a time-frequency display of a microseismic event having a longer duration than the microseismic event of FIG. 4.

For example, a sample of the input may be examined and determined if it is representative of the signal. This may be performed using a window consisting of an odd number of samples which are sorted in numerical order. The median value, i.e., the central sample of the sorted data, may be selected as the output of the median filter. The result may then be displayed using a color-map to render a color image of the time-frequency distribution representing the time series from the original seismic records (e.g., event file). The following Figures illustrate an example of results of this method. FIG. 4 shows a time-frequency display of a singular microseismic event and FIG. 5 shows the time-frequency display of a much longer duration microseismic event.

Figure 6:
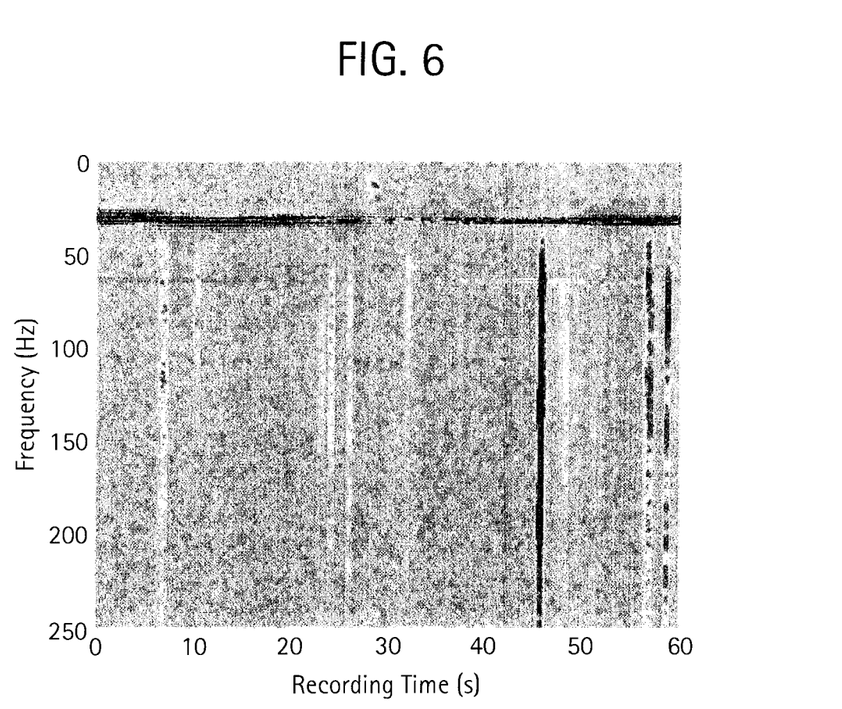
FIG. 6 is a time-frequency display of a microseismic event containing environment noise which is illustrated as a horizontal line.

The time-varying spectral estimate may then be digitally filtered to remove additional noise that becomes evident while plotting the spectral estimates. FIG. 6 shows the time-frequency display of a record containing environmental noise which is shown as a horizontal line in the display.

The overall frequency content of the selected seismic event of interest or the record of interest (e.g., event category) is determined. The Fast-Fourier transform (FFT) is used to determine additional attributes of the seismic event. The primary attributes of this part of the analysis are the amplitude versus frequency and phase versus frequency datasets which characterize the entire event or record rather than segments of the event or record. These datasets describe the basic frequency content of the seismic event over a longer period of time than the individual time windows created by the STFT algorithm described above. This step is referred to herein as the time invariant spectral estimate because there is only one window of analysis with respect to onset of the event.

Figure 7:
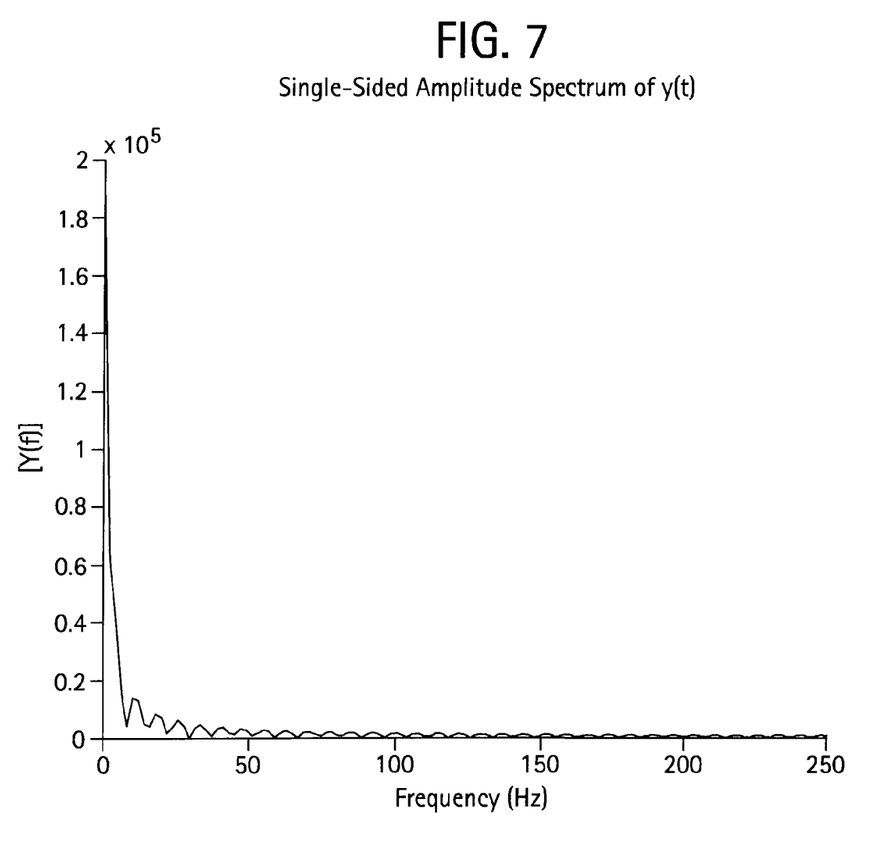
FIG. 7 is an illustration of an amplitude spectrum for a microseismic record.

In this embodiment, the amplitude versus frequency dataset (amplitude spectrum) and phase versus frequency dataset (phase spectrum) may be determined from windows long enough to encompass the seismic event but short enough to avoid other seismic events. The primary function of event analysis via the FFT is determination of the amplitude spectrum and phase spectrum of the event to quickly discriminate seismic events of differing origin. Event analysis via FFT runs much more quickly than time-frequency, thus the analysis via FFT can be used as a complimentary real-time tool for event discrimination (step 312). FIG. 7 shows the amplitude spectrum of a seismic record.

Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A system of discriminating a controlled seismic source from a subsurface seismic source, comprising:
    a seismic sensor positioned proximate to a wellbore,
    a controlled seismic source to produce a seismic wave;
    a computer in communication with the seismic sensor; and
    a set of instructions executable by the computer that, when executed:
        acquire data received from the seismic sensor;
        select an event of interest from the acquired data;
        determine a spectral attribute of the selected event of interest wherein the determined spectral attribute comprises a time-varying spectral estimate comprising a series of amplitude versus frequency and phase versus frequency datasets generated by time-frequency display analysis of seismic waveform data received by the seismic sensor proximate to the borehole,
        apply a non-linear digital filtering technique to the time-varying spectral estimate; wherein the non-linear filtering technique comprises a median filter and wherein the median filter is applied to an odd number of overlapping time-varying spectral estimates sorted in numerical order;
        generate an image of the filtered time-varying spectral estimate, wherein the image is color coded to distinguish between overlapping amplitude versus frequency and phase versus frequency datasets;
        compare the determined spectral attribute of the selected event of interest to a known event category spectral attribute;
        identify the selected seismic event of interest relative to the known spectral event category attribute; wherein the identified seismic event of interest is an orientation shot generated by an orientation source;
        analyze acquired data pertaining to the orientation shot, and
        adjust an orientation of the seismic sensor using acquired data pertaining to the orientation shot.

2. The system of claim 1, wherein the determined spectral attribute is divided into a series of overlapping sub-segments according to a selected time window and processed to create a short-time Fourier Transform of at least a portion of the seismic waveform data during the selected time window.

3. The system of claim 1, wherein the spectral attribute comprises an amplitude spectrum and a phase spectrum.

4. The system of claim 1, wherein the controlled seismic source is a perforation shot.

5. The system of claim 1, wherein the controlled seismic source is positioned on the surface.

6. The system of claim 1, wherein the known category event spectral attribute comprises one selected from the group of a perforation shot, a string shot, and a microseismic event.

7. The system of claim 1, further comprising a hydraulic fracturing apparatus in operational connection with the wellbore.

8. A non-transitory computer readable medium that carries instructions to identify a source of a seismic event by performing steps comprising:
    receiving data from a seismic sensor;
    selecting an event of interest from the data received;
    determining a spectral attribute of the selected event of interest wherein the determined spectral attribute comprises a time-varying spectral estimate comprising a series of amplitude versus frequency and phase versus frequency datasets generated by time-frequency display analysis of seismic waveform data received by the seismic sensor proximate to the borehole;
    applying a non-linear digital filtering technique to the time-varying spectral estimate; wherein the non-linear filtering technique comprises a median filter and wherein the median filter is applied to an odd number of overlapping time-varying spectral estimates sorted in numerical order;
    generating an image of the filtered time-varying spectral estimate, wherein the image is color coded to distinguish between overlapping amplitude versus frequency and phase versus frequency datasets;
    comparing the determined spectral attribute of the selected event of interest to a known event category spectral attribute;
    identifying the selected event of interest relative to the known spectral event category attribute; wherein the identified seismic event of interest is an orientation shot generated by an orientation source;
    analyzing acquired data pertaining to the orientation shot; and
    utilizing acquired data pertaining to the orientation shot, adjusting an orientation of the seismic sensor.

9. The non-transitory computer readable medium of claim 8, further comprising the steps of:
    performing a hydraulic fracture operation on a wellbore;
    confirming that the selected event of interest is an orientation shot;
    mapping a fracture forming in a formation from the hydraulic and fracture operation; and
    altering the hydraulic fracture operation 10. The non-transitory computer readable medium of claim 8, wherein the spectral estimate of an event category comprises an event category selected from the group of a perforation shot, a string shot, and a microseismic event.

11. The non-transitory computer readable medium of claim 8, wherein the determined spectral attribute is divided into a series of overlapping sub-segments according to a selected time window and processed to create a short-time Fourier Transform of at least a portion of the seismic waveform data during the selected time window.

12. The non-transitory computer readable medium of claim 8, wherein the determined spectral estimate comprises an amplitude spectrum and a phase spectrum.

13. A computer-implemented method of discriminating a controlled seismic source from a subsurface seismic source, comprising the steps of providing a seismic sensor positioned proximate to a wellbore;
  providing a controlled seismic source to produce a seismic wave;
  providing a computer in communication with the seismic sensor; and
  a set of instructions executable by the computer that, when executed:
    acquire data received from the seismic sensor;
    select an event of interest from the acquired data;
    determine a spectral attribute of the selected event of interest wherein the determined spectral attribute comprises a time-invariant spectral estimate characterizing the entire event of interest, the determined spectral attribute comprising a series of amplitude versus frequency and phase versus frequency datasets generated by fast Fourier Transform analysis of seismic waveform data received by the seismic sensor proximate to the borehole;
    apply a non-linear digital filtering technique to the time-invariant spectral estimate;
    generate an image of the filtered time-invariant spectral estimate; wherein the image is color coded to distinguish between overlapping amplitude versus frequency and phase versus frequency datasets;
    compare the determined spectral attribute of the selected event of interest to a known event category spectral attribute;
    identify the selected seismic event of interest relative to the known spectral event category attribute; wherein the identified seismic event of interest is an orientation shot generated by an orientation source;
    analyze acquired data pertaining to the orientation shot; and
    adjust an orientation of the seismic sensor using acquired data pertaining to the orientation shot.

14. The computer-implemented method of claim 13, wherein the spectral attribute comprises an amplitude spectrum and a phase spectrum.

15. The computer-implemented method of claim 13, wherein the controlled seismic source is a perforation shot.

16. The computer-implemented method of claim 13, wherein the controlled seismic source is positioned on the surface.

17. The computer-implemented method of claim 13, wherein the known category event spectral attribute comprises one selected from the group of a perforation shot, a string shot, and a microseismic event.

* * * * *